United States Patent [19]
Kajimura et al.

[11] Patent Number: 5,053,995
[45] Date of Patent: Oct. 1, 1991

[54] TUNNEL CURRENT DATA STORAGE APPARATUS HAVING SEPARATE LEVER BODIES

[75] Inventors: Hiroshi Kajimura, Tokyo; Toshihito Kouchi, Tama; Akitoshi Toda, Kunitachi; Yasuo Isono, Fussa; Yoshiyuki Mimura; Hiroko Ohta, both of Hachioji; Ryouhei Shimizu, Koshigaya, all of Japan

[73] Assignee: Olympus Optical Co., Ltd., Tokyo, Japan

[21] Appl. No.: 468,640

[22] Filed: Jan. 23, 1990

[30] Foreign Application Priority Data

Feb. 3, 1989 [JP] Japan ................................ 1-25183

[51] Int. Cl.$^5$ ........................ G11C 13/00; G11C 7/00
[52] U.S. Cl. ................................. 365/151; 365/157; 365/118; 365/237; 250/310
[58] Field of Search ............... 365/126, 128, 174, 234, 365/237, 118, 157, 215, 151; 369/101; 250/492.3, 306, 311, 310

[56] References Cited

U.S. PATENT DOCUMENTS

| | | | |
|---|---|---|---|
| 4,133,047 | 1/1979 | Levinthal | 365/128 X |
| 4,575,822 | 3/1986 | Quate | 365/174 |
| 4,760,567 | 7/1988 | Crewe | 365/128 X |
| 4,829,507 | 5/1989 | Kazan et al. | 365/174 X |
| 4,831,614 | 5/1989 | Duerig et al. | 369/100 |
| 4,945,515 | 7/1990 | Ooumi et al. | 365/174 |

FOREIGN PATENT DOCUMENTS

| | | |
|---|---|---|
| 0247219 | 12/1987 | European Pat. Off. |
| 0272935 | 6/1988 | European Pat. Off. |
| 2637409 | 4/1990 | France |

OTHER PUBLICATIONS

IBM-TDB, vol. 11, No. 8, Jan. 1969, "Electron Beam Scanner" by Broers et al.

*Primary Examiner*—Alyssa H. Bowler
*Attorney, Agent, or Firm*—Frishauf, Holtz, Goodman & Woodward

[57] ABSTRACT

A data storage apparatus includes a first lever body having a piezoelectric driving section, and a second lever body which is disposed to separate from and to be perpendicular to the first lever body, and has a piezoelectric driving section. A recording medium is formed on a portion of the second lever body, and records desired data. A plurality of probes are disposed on a portion of the first lever body to oppose the recording medium at a predetermined interval, and detect a change in state at predetermined positions on the recording medium as a change in tunnel current or a change in three-dimensional pattern. A voltage applying circuit alternately applies predetermined voltages to the piezoelectric driving sections of the first and second lever bodies to separately drive the plurality of probes in different directions, thereby three-dimensionally scanning the recording medium.

20 Claims, 3 Drawing Sheets

TUNNEL CURRENT DATA STORAGE APPARATUS HAVING SEPARATE LEVER BODIES

Background of the Invention

1. Field of the Invention

The present invention relates to a data storage apparatus and, more particularly, to a data storage apparatus which can read or write a charge or a magnetic domain formed on a selected region of a recording medium using a tunnel current probe on the basis of the principle of, e.g., a scanning tunneling microscope (to be referred to as an STM hereinafter).

2. Description of the Related Art

In recent years, according to Binning, Rohrer, et al. of the IBM Corporation, an STM tends to be used as a tool for scanning a surface of a sample using a small probe (the radius of its distal end is about 10 nm) while keeping it at a position within a distance of several nm from the sample surface so as to reconstruct an atomic structure of a material as an image and to probe a surface state on the order of Å (0.1 nm).

An early STM was a large structure comprising an anti-vibration base. However, by applying micromechanical techniques, the STM has been made compact and miniaturized, thus solving problems of vibration, thermal drift, and the like. Recently, the C. F. Quate group of the Stanford University formed a cantilever type STM having dimensions of $5 \times 200 \times 1,000$ ($\mu$m) on a silicon substrate by arranging an STM actuator to allow three-dimensional scanning using the same micromechanical techniques (IC process). More specifically, the cantilever is formed in such a manner that a ZnO film is sandwiched between Al electrodes to be divided into four sections, and drive sources in units of sections are appropriately combined and controlled to attain three-dimensional scanning necessary for an STM operation, as shown in FIG. 1.

The C. F. Quate group also invented formation of an STM memory by scanning a probe to read out a displacement (indicating the presence/absence of recording) on or near a scanned surface as a change in tunnel current in a method and means for data storage using tunnel current data readout disclosed in U.S. Pat. No. 4,575,822.

The C. F. Quate group mentioned in the above reference that a cantilever type STM was used for a memory apparatus. The STM itself is arranged to allow a three-dimensional operation so as to be able to serve as a scanning tunneling microscope. More specifically, in the operation mode of the distal end of the cantilever shown in FIG. 1, when electric field vectors E1, E2, E3, and E4 shown in FIG. 1 are applied to four driving bodies defined by the central electrode and upper, lower, left, and right electrode layers which sandwich piezoelectric bodies of ZnO layers, the following movements occur in the coordinate system of FIG. 1:

| | | |
|---|---|---|
| (a) X: Positive direction: | E2 = E4 > E1 = E3 | |
| : Negative direction: | E1 = E3 > E2 = E4 | |
| (b) Y: Positive direction: | E1 = E2 = E3 = E4 < 0 | |
| : Negative direction: | E1 = E2 = E3 = E4 > 0 | |
| (c) Z: Positive direction: | E1 = E2 < E3 = E4 | |
| : Negative direction: | E1 = E2 > E3 = E4 | |

Thus, with the dimensions of $5 \times 200 \times 1,000$ ($\mu$m), from calculations performed assuming that deposited ZnO layers are used as piezoelectric bodies, a movement of 22 Å/V (2.2 nm/V) occurs in the X direction as horizontal scanning on the surface; a movement of 220 Å/V (22 nm/V) occurs in the Y direction; and a movement of 7,700 Å/V (770 nm/V) occurs in the Z direction as an approaching operation to the surface. For example, if an operation voltage of 10 V is applied for horizontal scanning, a horizontal surface scanning range is $22 \text{ nm} \times 220$ nm. In this manner, the cantilever type STM has a sufficient stroke (scanning range) of an observation field and an approaching operation to the surface (Z direction) when the surface of a sample material is observed.

When an STM is used as a part of a memory apparatus, a charge or a magnetic domain is formed in a lattice pattern in a molecular size on a selected surface region of a recording medium, and a recording density of several Å to several tens of Å can be obtained. However, when an STM constitutes a mass memory, the above-mentioned STM has an insufficient stroke in the X direction. That is, if the lattice pitch is set to be 0.5 nm in the above-mentioned stroke range, the recording density is about 20 Kbits. For this reason, even if 100 probes are disposed on one chip using the IC process, the obtained recording density is at most 2 Mbits. Thus, the STM cannot be directly used in a mass memory due to a limitation in this respect.

The STM commonly uses electrodes in the movements in the X, Y, and Z directions. For this reason, when a stroke in the X direction is to be obtained, the probe must be simultaneously controlled in the Z or Y direction. Thus, interference inevitably occurs, resulting in poor controllability.

SUMMARY OF THE INVENTION

It is therefore an object of the present invention to provide a data storage apparatus which can extend a scanning range and allows easy control and efficient arrangement.

In order to achieve the above object, the data storage apparatus of the present invention comprises:

a first lever body having a piezoelectric driving section;

a second lever body having a piezoelectric driving section driven in a direction perpendicular to a drive direction of the first lever body;

a recording medium, formed on a portion of the second lever body, for recording desired data;

detection means, disposed on a portion of the first lever body to oppose the recording medium at a predetermined interval, for detecting a change in state at a predetermined position on the recording medium as one of a change in tunnel current and a change in three-dimensional pattern; and voltage applying means for alternately applying predetermined voltages to the piezoelectric driving sections of the first and second lever bodies to separately drive the detection means in different directions, thereby three-dimensionally scanning the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

An embodiment of the present invention will be described below with reference to the accompanying drawings.

Figure 1:
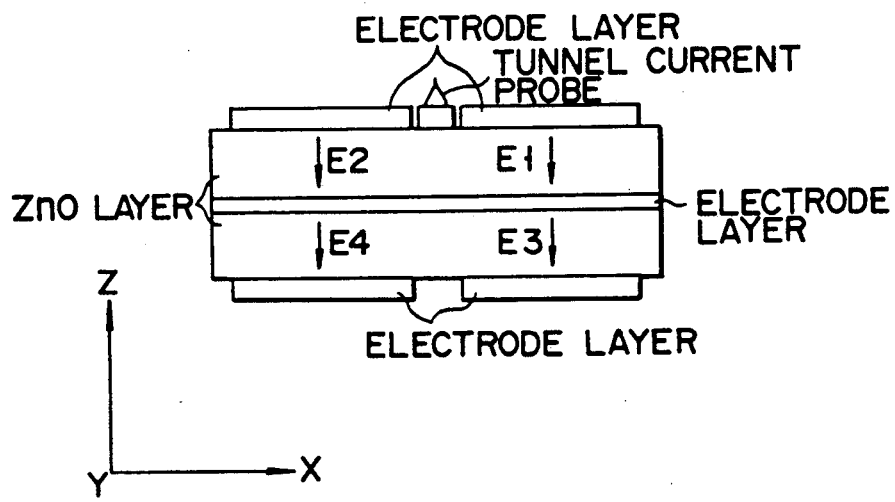
FIG. 1 is a sectional view showing a structure of a conventional data storage apparatus.
Figure 2:
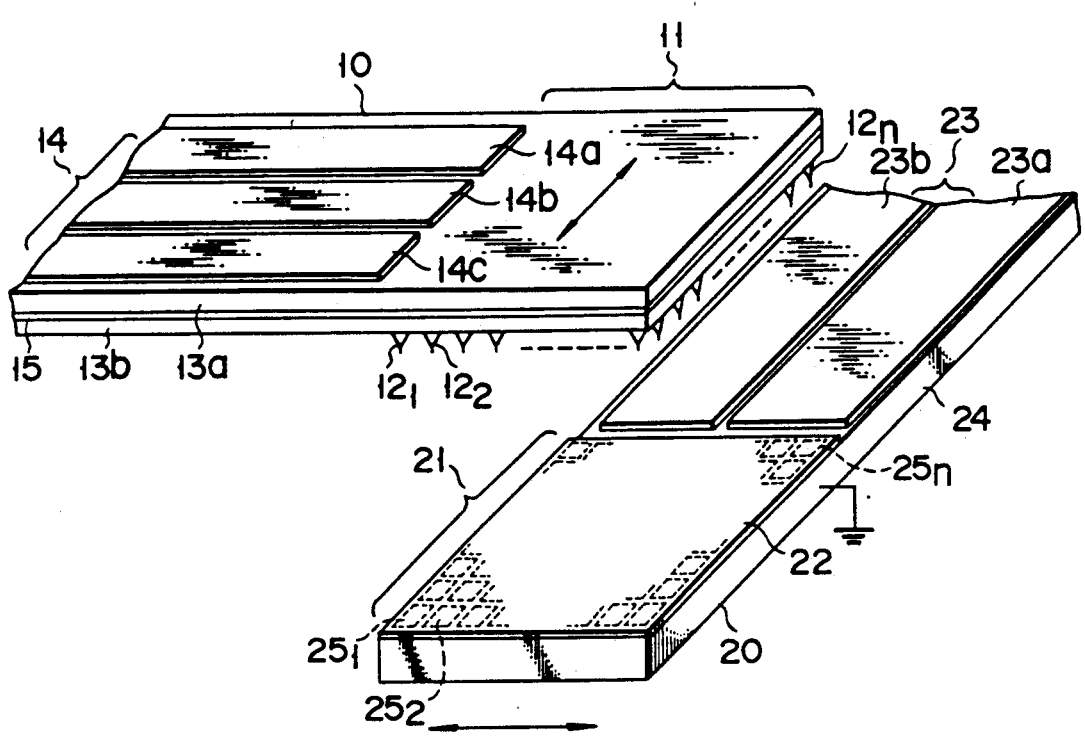
FIG. 2 is a schematic perspective view showing an embodiment of a data storage apparatus according to the present invention.
Figure 3:
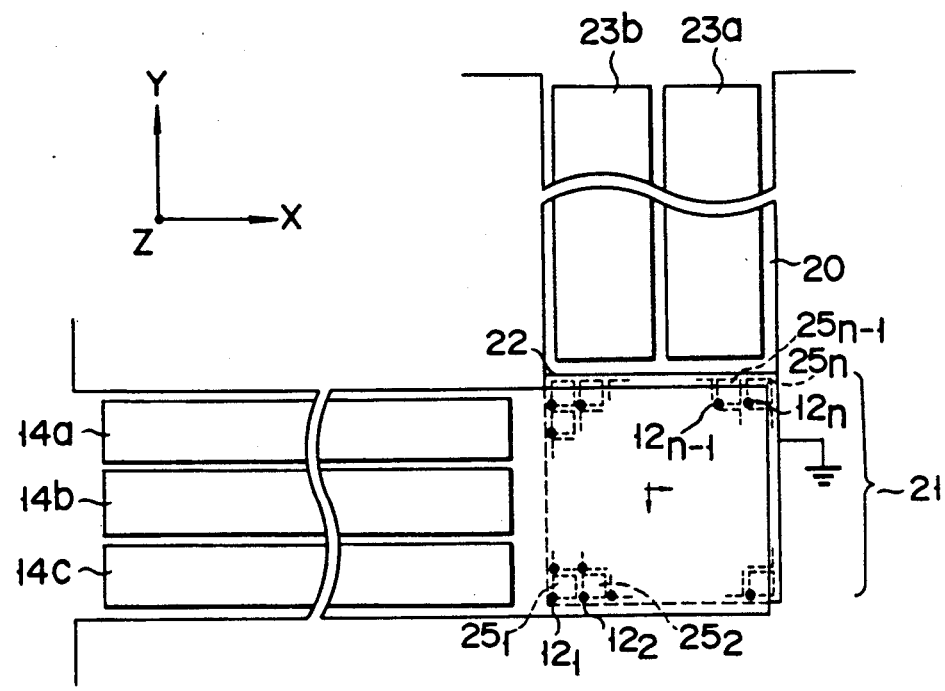
FIG. 3 a plan view of a data storage apparatus shown in FIG. 2.

FIGS. 2 and 3 are respectively a perspective view and a plan view schematically showing a data storage apparatus of the present invention, e.g., an STM memory apparatus. The STM memory apparatus is arranged by disposing a first cantilever (lever body) 10 and a second cantilever (lever body) 20 to be perpendicular to each other. Each of the first and second cantilevers 10 and 20 has dimensions of about 10 $\mu m \times 2{,}000$ $\mu m \times 2$ cm. However, the present invention is not limited to this. A free-end region 11 is formed at the distal end of the first cantilever 10, and a free-end region 21 is formed at the distal end of the second cantilever 20. The free-end regions 11 and 21 oppose each other in the vertical direction, and their overlapping region serves as a scanning region.

A plurality of tunnel current probes $12_1, 12_2, \ldots, 12_n$ are disposed on the lower surface of the scanning region of the first cantilever 10. Each of these tunnel current probes $12_1, 12_2, \ldots, 12_n$ has a length of, e.g., 0.2 to 0.3 $\mu m$. Furthermore, the probes $12_1, 12_2, \ldots, 12_n$ are disposed at predetermined intervals, e.g., at intervals of 1 to 2 $\mu m$ (almost equal to a scanning amplitude) in the scanning direction. The probes $12_1, 12_2, \ldots, 12_n$ are also disposed at the same intervals as described above in the longitudinal direction of the first cantilever 10.

A recording body (recording medium) 22 is formed on the upper surface of the scanning region of the second cantilever 20. Information corresponding to data to be written, e.g., a charge or a magnetic domain is formed on the medium surface of the recording body 22 in a molecular size. For this reason, the probes $12_1, 12_2, \ldots, 12_n$ and the recording body 22 are brought sufficiently close to each other.

The arrangement of piezoelectric bodies and electrodes on the first cantilever 10 will be described below. On the first cantilever 10, two ZnO layers (piezoelectric bodies) 13a and 13b are sandwiched between a plurality of flat patterns of upper and lower Al electrodes 14 (the lower Al electrode 14 is omitted in FIG. 2 for the sake of simplicity) and an intermediate Al electrode 15, thus constituting three separate, independent piezoelectric driving bodies.

Electrode patterns 14a, 14b, and 14c of the upper and lower Al electrodes 14 arranged to divide the first cantilever 10 into three sections in its longitudinal direction form two sets of piezoelectric driving bodies. More specifically, one set including the electrode patterns 14b (the upper and lower Al electrodes 14b) serves as electrodes for bending the cantilever 10 in the Z direction in such a manner that one electrode expands and the other electrode contracts in the longitudinal direction upon application of opposite-phase voltages by a voltage circuit connected through a lead wire (not shown) using the Al electrode 15 as a common electrode. The other set including pairs of the electrode patterns 14a and 14c (i.e., a pair of upper and lower Al electrodes 14a, and a pair of upper and lower Al electrodes 14c) serves as electrodes connected to a circuit (not shown) for bending the cantilever 10 in the Y direction. For example, when a voltage is applied for contracting the upper and lower electrode patterns 14a and 14a, and when a voltage is applied for expanding the upper and lower electrode patterns 14c and 14c, the free-end region 11 of the first cantilever 10 is moved in the Y direction.

On the other hand, electrode patterns 23a and 23b of upper and lower opposing Al electrode layers 23 (the lower Al electrode layer is omitted in FIG. 2 for the sake of simplicity) of the second cantilever 20 sandwich a ZnO layer 24 therebetween, and divide the entire second cantilever 209 into two section in the longitudinal direction to constitute a set of piezoelectric driving bodies. More specifically, pairs of the electrode patterns 23a and 23b (i.e., pairs of upper and lower Al electrodes 23a and 23b) serve as electrodes, connected to a circuit (not shown), for bending the cantilever 20 in the X direction in such a manner that one of each pair of electrodes expands and the other electrode contracts upon application of opposite-phase voltages to the corresponding driving bodies.

In this embodiment, the tunnel current probes $12_1, 12_2, \ldots, 12_n$ are disposed at predetermined intervals in the scanning direction on the lower surface of the scanning region of the first cantilever 10 in correspondence with the upper surface of the scanning region of the second cantilever 10. More specifically, the probes are disposed at high density to attain a pattern size of an IC process corresponding to he scanning amplitude in the scanning direction (Y direction) of the width of the cantilever 10, and to be equivalent to the scanning amplitude of the cantilever 20 in the longitudinal direction (X direction) of the cantilever 10. These tunnel current probes $12_1, 12_2, \ldots, 12_n$ are formed into a cone-like shape by repetitively depositing a metal through a mask.

The recording body 22 is formed on a surface region, opposing the probes $12_1, 12_2, \ldots, 12_n$, of the free-end region 21 of the second cantilever 20. Data are written in the recording body 22 in units of regions $25_1, 25_2, \ldots, 25_n$ corresponding to the probes $12_1, 12_2, \ldots, 12_n$. The size of each region is about $2 \times 2$ $\mu m$. However, the present invention is not limited to this.

Note that the tunnel current probes $12_1, 12_2, \ldots, 12_n$ may be disposed on the second cantilever 20, and the recording body 22 may be formed on the first cantilever 10.

Figure 4:
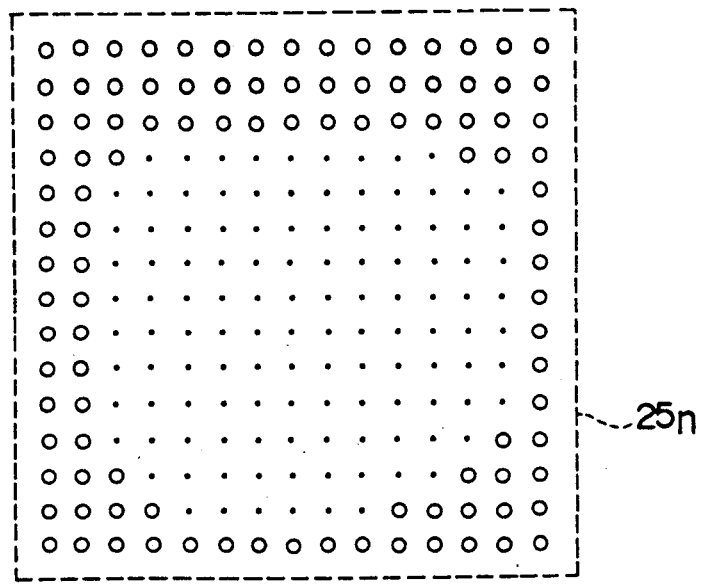
FIG. 4 is a view for explaining an example of a data pattern.

As shown in FIG. 4, in this embodiment, a dot data pattern is written at a predetermined pitch in a region $25_n$ using a certain tunnel current probe (e.g., $12_n$), and the data pattern is used as a clock signal in a write or read mode for the regions $25_1, 25_2, ..., 25_n$ under the remaining probes $12_1, 12_2, ..., 12_n$. However, the data pattern need not always be used as a clock. For example, data patterns having different pitches are written in a plurality of regions to selectively use different clock signals.

Figure 5:
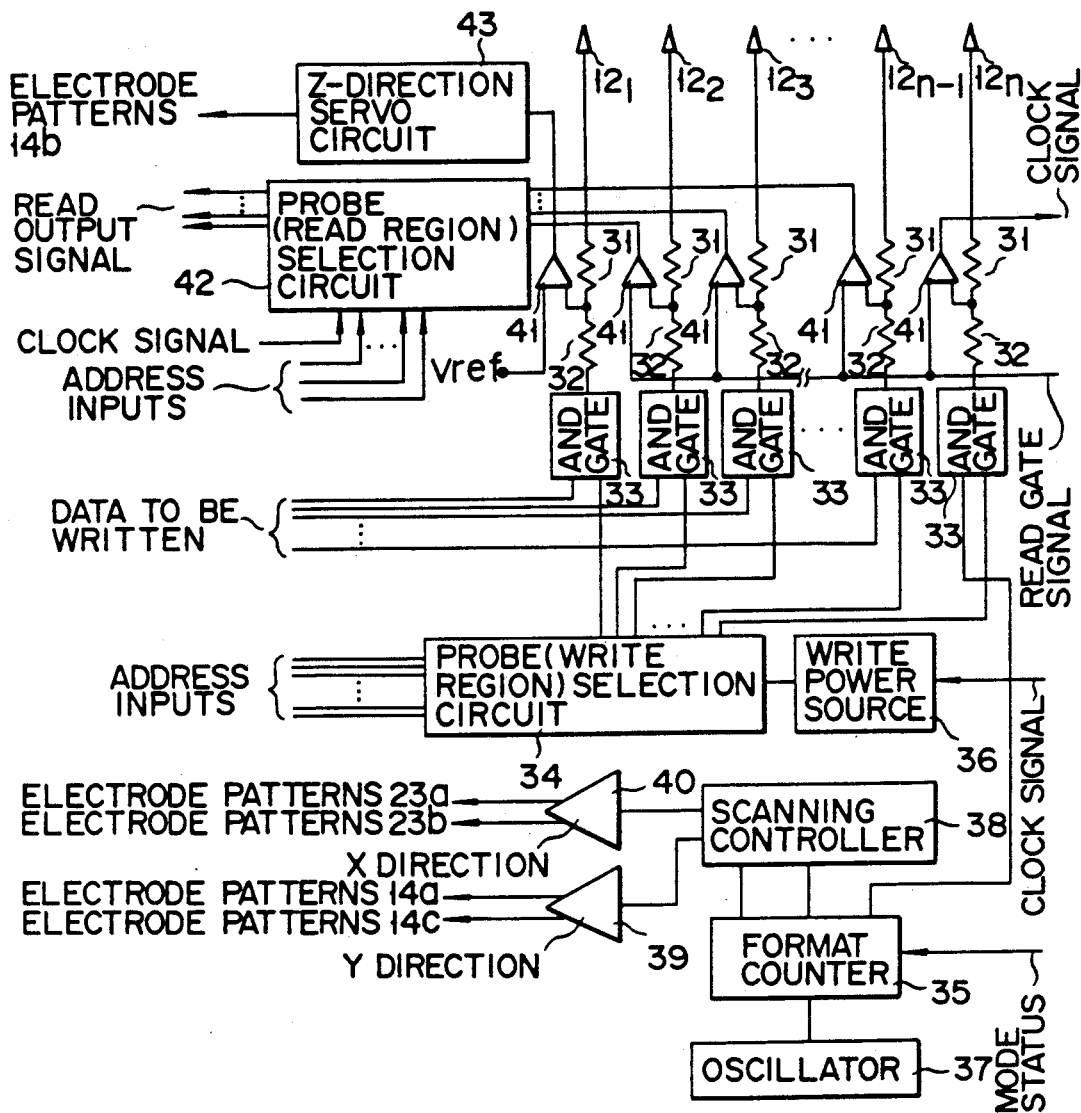
FIG. 5 is a schematic block diagram showing an arrangement of an electrical circuit of the data storage apparatus according to the present invention.

FIG. 5 schematically shows an arrangement of an electrical circuit. In FIG. 5, the tunnel current probes $12_1, 12_2, ..., 12_n$ are respectively connected to the output terminals of AND gates 33 through corresponding series circuits of resistors 31 and 32. One input terminal (excluding the probe $12_n$) of each of these AND gates 33 is connected to a supply section (not shown) for supplying data to be written, and the other input terminal is connected to a probe (write region) selection circuit 34 for selecting the probes $12_1, 12_2, ..., 12_n$ corresponding to the regions $25_1, 25_2, ..., $ or $25_n$ as a data write position. A format counter 35 for controlling a scanning position is connected to one input terminal of the AND gate 33 connected to the above-mentioned specific probe $12_n$.

The probe selection circuit 34 is connected to a main controller (not shown) to receive address inputs for selecting the probes $12_1, 12_2, ..., 12_n$. The circuit 34 is also connected to a write power source 36. The write power source 36 is connected to a current detector (to be described later) arranged in the specific probe $12_n$, and receives the output (clock signal) from the current detector.

The format counter 35 is connected to the main controller, an oscillator 37, a scanning controller 38, and the like, and receives mode status data from the main controller and a predetermined oscillation output from the oscillator 37.

The scanning controller 38 is connected to a voltage circuit 39 for applying voltages the phases of which are opposite to each other to the electrode pairs of the electrode patterns 14a and 14c so as to bend the first cantilever 10 in the Y direction, and a voltage circuit 40 for applying voltages the phases of which are opposite to each other to the electrode pairs of electrode patterns 23a and 23b so as to bend the second cantilever 20 in the X direction.

The connecting node of each pair of the resistors 31 and 32 is connected to one input terminal of a corresponding one of current detectors 41. Of these current detectors 41, the other input terminal of the current detector 41 of, e.g., the probe $12_1$ receives a reference voltage (Vref). The output terminal of the current detector 41 of the probe $12_1$ is connected to a servo circuit 43 for applying voltages the phases of which are opposite to each other to the electrode patterns 14b so as to bend the first cantilever 10 in the Z direction and to control intervals between the probes $12_1, 12_2, ..., 12_n$ and the recording body 22.

The other input terminal of each of the remaining current detectors 41 is connected to the main controller, and receives a read gate signal. The output terminals of these current detectors 41 (excluding those of the probes $12_1$ and $12_n$) are connected to a probe (read region) selection circuit 42 for selecting the probes $12_2, ..., 12_{n-1}$ corresponding to the regions $25_2, ..., 25_{n-1}$ as a data read position. The probe selection circuit 42 receives address inputs for selecting the probes $12_2, ..., 12_{n-1}$ and the clock signal. Thus, data written in one or a plurality of regions can be selectively read out.

The operation of the above arrangement will be described below. Assume that a mode status signal is supplied from the main controller (not shown) to the format counter 35. The format counter 35 controls the scanning controller 38 in accordance with the oscillation output from the oscillator 37.

The scanning controller 38 controls the voltage circuits 39 and 40 to alternately apply opposite-phase voltages to the corresponding electrode patterns 14a and 14c, and 23a and 23b. Thus, the first cantilever 10 is scanned in a direction indicated by the Y-axis, and the second cantilever 20 is scanned in a direction indicated by the X-axis. In this case, the scanning controller 38 performs synchronization while determining corresponding cycles, so that the tunnel current probes $12_1, 12_2, ..., 12_n$ arranged on the free-end region 11 of the first cantilever 10 scan the recording body 22 on the free-end region 21 of the second cantilever 20.

A tunnel current from the tunnel current probe $12_1$ is supplied to the servo circuit 43, and voltages are applied to the electrode patterns 14b of the first cantilever 10, thereby servo-driving the driving bodies. Thus, the first cantilever 10 is driven in the vertical direction, i.e., a direction indicated by the Z-axis, so that the distances between the tunnel current probes $12_1, 12_2, ..., 12_n$ and the recording body 22 are kept at predetermined values.

In this state, data write access by the tunnel current probes $12_1, 12_2, ..., 12_n$ will be described below. When data is to be written, the probe selection circuit 34 selects an output from the write power source 36 in accordance with the address inputs, and selects the AND gates 33 connected to the probes corresponding to regions in which data is to be written. In this case, when a data pattern of a predetermined pitch is to be written, the AND gate 33 connected to, e.g., the probe $12_n$ is selected, and the AND gate 33 is gated by the clock to be written, which is supplied from the format counter 35, thereby recording the dot data pattern in the corresponding region $25_n$ at a predetermined pitch. When normal data is written, the AND gate 33 selected by the probe selection circuit 34 is gated by data to be written and the output from the write power source 36, which is supplied in accordance with the clock read out from the region $25_n$ by the probe $12_n$. Thus, the data to be written is recorded in the corresponding region by the probe selected by the probe selection circuit 34 at the same pitch as the data pattern. Note that the data write access is performed in synchronism with the output from the format counter 35.

Data read access by the tunnel current probes $12_1, 12_2, ..., 12_n$ will be described below. Assume that a data pattern of a predetermined pitch has already been recorded in, e.g., the region $25_n$ corresponding to the probe $12_n$.

When data is to be read out, one or a plurality of the current detectors 41 connected to the probes $12_1, ..., 12_{n-1}$ are selected by the probe selection circuit 42 in accordance with the address inputs according to regions from which data is to be read out. The output from the selected current detector 41 is derived in accordance with the clock, so that readout data is reproduced as a read output signal. The data read access is performed in synchronism with the output from the format counter 35.

As described above, the piezoelectric bodies and the driving bodies constituted by the electrodes sandwiching the piezoelectric bodies of each cantilever used as an STM unit are separately and independently arranged, and a plurality of tunnel current probes are efficiently arranged Thus, an IC process including formation of piezoelectric bodies and electrode patterns can be facilitated. In addition, a sufficient horizontal stroke can be obtained in units of STM units, and control of distances between each probe and a recording body and control of two scanning directions can be independently executed. Therefore, control can be facilitated, and extended scanning ranges can be efficiently utilized by a plurality of probes.

The present invention is not limited to the above embodiment, and various changes and modifications may be made within the spirit and scope of the invention.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A data storage apparatus for storing data, comprising:
    a first lever body having a driving section for driving said first lever body in a predetermined direction;
    a second lever body having a driving section for driving said second lever body in a direction substantially perpendicular to said predetermined direction of said first lever body;
    a recording medium, formed on a portion of one of said first and second lever bodies, for recording said data;
    detection means comprising, a plurality of probes disposed on a portion of the other of said first and second lever bodies, and positioned opposite and spaced from said recording medium by a predetermined distance, said detection means detecting changes at predetermined positions on said recording medium; and
    voltage application means for alternately applying preselected voltage to said driving sections of said first and second lever bodies to displace said detection means and said recording medium, relative to each other in different dimensions, thereby enabling multi-dimensional scanning of said recording medium.

2. A data storage apparatus according to claim 1, wherein said displacement is about 1 to 2 μm.

3. A data storage apparatus according to claim 1, wherein the length of each of said plurality of probes is about 0.2 to 0.3 μm.

4. A data storage apparatus according to claim 1, wherein dimensions of each of said first and second lever bodies are approximately 10 μm×2,000 ×2 cm.

5. A data storage apparatus according to claim 1, further comprising current detectors connected to said plurality of probes; and a servo circuit, connected to one of said current detectors, for maintaining said predetermined distance between said plurality of probes and said recording medium.

6. A data storage apparatus according to claim 1, wherein each of said first and second lever bodies has a greater length than width and wherein said voltage application means comprises:
    first voltage application means for applying a first voltage to said driving section of said first lever body to drive said first lever body in a direction substantially perpendicular to said length thereof; and
    second voltage application means for applying a second voltage to said driving section of said second lever body to drive said second lever body in a direction substantially perpendicular to said length thereof.

7. A data storage apparatus according to claim 1, wherein the probes of said plurality of probes are separated from each other by an interval almost equal to said displacement of said probes relative to said recording medium as measured in a direction along said recording medium.

8. A data storage apparatus according to claim 7, further comprising:
    read and write means, connected to a selected one of said plurality of probes, for writing a data pattern on said recording medium, said data pattern having a predetermined pitch in a range corresponding to said relative displacement of said probes relating to said recording medium; and
    clock signal sensing means connected to at least one of said probes, other than said selected probe, for enabling said at least one of said probes to sense said data pattern as a clock signal to thereby enable accessing of said recorded data by said at least one of said probes.

9. A data storage apparatus according to claim 8, further comprising read and write means connected to at least one of said plurality of probes for writing data patterns on said recording medium said data pattern having different pitches in ranges corresponding to said relative displacement of said probes and said recording medium relative to each other; and clock signal sensing means connected to at least one of said probes other than said at least one probe, to sense said data patterns as different clock signals.

10. A data storage apparatus according to claim 1, wherein tunnel currents are generated as said lever bodies move relative to each other and wherein said probes sense said generated tunnel currents as said first and second lever bodies are displaced relative to each other.

11. A data storage apparatus according to claim 1, wherein said stored data comprises three dimensional data, and wherein said multi-dimensional scanning of said recording medium is three dimensional scanning of said recording medium.

12. A data storage apparatus according to claim 1, wherein said driving sections of said first lever body and of said second lever body each comprise piezoelectric driving sections.

13. A data storage apparatus for storing data, comprising:
    a first lever body including at least two piezoelectric driving sections, each of said driving sections comprising: first and second piezoelectric layers, a first electrode layer positioned between said first and second piezoelectric layers; and second electrode layers sandwiching said firs and second piezoelectric layers;
    a second lever body having a piezoelectric driving section including a pair of electrode layers, said second lever body being positioned perpendicular to and spaced a predetermined distance from said first lever body;

a recording medium, formed on a portion of said second lever body, for recording data to be stored thereon;

detection means, including a plurality of probes disposed on a portion of said first lever body opposite to and spaced by said predetermined distance from said recording medium, for detecting changes in state at predetermined positions on said recording medium; and voltage application means for alternately applying predetermined voltages to said piezoelectric driving sections of said first and second lever bodies to displace said detection means and said recording medium relative to each other in different dimensions, thereby enabling multi-dimensional scanning of said recording medium.

14. A data storage apparatus according to claim 13, wherein the length of each of said plurality of probes is about 0.2 to 0.3 μm.

15. A data storage apparatus according to claim 13, wherein the dimensions of each of said first and second lever bodies are approximately 10 μm×2,000 μm×2 cm.

16. A data storage apparatus according to claim 13, wherein each of said first and second lever bodies has a greater length than width; and wherein said voltage application means includes first voltage application means for applying a first voltage to said piezoelectric driving section of said first lever body, and second voltage application means for applying a second voltage to said piezoelectric driving section of said second lever body.

17. A data storage apparatus according to claim 16, wherein each of said second electrode layers of said first lever body includes three electrode patterns for providing three pairs of electrodes; and wherein said fist voltage is applied to two of said three electrode pairs to bend said first lever body in a direction substantially perpendicular to said length thereof.

18. A data storage apparatus according to claim 16, wherein each of said pair of electrode layers of said second lever body includes two electrode patterns for providing two electrodes; and wherein said second voltage is applied to said two pairs of electrodes to bend said second electrode body in a direction substantially perpendicular to said length thereof.

19. A data storage apparatus according to claim 13, wherein the probes of said plurality of probes are separated from each other by a distance almost equal to said displacement of said probes relative to said recording medium as measured along said recording medium.

20. A data storage apparatus according to claim 19, wherein the scanning amplitude is about 1 to 2 μm.

* * * * *